US012639152B2

(12) United States Patent
Coady et al.

(10) Patent No.: US 12,639,152 B2
(45) Date of Patent: *May 26, 2026

(54) DYNAMIC NETWORK DEBUG SERVICE IN A CONTAINERIZED COMPUTING CLUSTER

(71) Applicant: Red Hat, Inc., Raleigh, NC (US)

(72) Inventors: Stephen Coady, Waterford (IE); Mark O'Brien, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,112

(22) Filed: Jul. 31, 2024

(65) Prior Publication Data

US 2024/0394138 A1     Nov. 28, 2024

Related U.S. Application Data

(63) Continuation of application No. 18/082,221, filed on Dec. 15, 2022, now Pat. No. 12,072,758.

(51) Int. Cl.
| | |
|---|---|
| *G06F 11/00* | (2006.01) |
| *G06F 11/07* | (2006.01) |
| *G06F 11/36* | (2006.01) |
| *G06F 11/362* | (2025.01) |
| *G06F 11/3698* | (2025.01) |
| *G06F 9/455* | (2018.01) |

(52) U.S. Cl.
CPC ........ *G06F 11/079* (2013.01); *G06F 11/0709* (2013.01); *G06F 11/36* (2013.01); *G06F 11/362* (2013.01); *G06F 11/3698* (2025.01); *G06F 2009/45562* (2013.01); *G06F 2009/45591* (2013.01); *G06F 2009/45595* (2013.01)

(58) Field of Classification Search
CPC .... G06F 11/0709; G06F 11/079; G06F 11/36; G06F 11/362; G06F 11/2664
See application file for complete search history.

(56) References Cited

U.S. PATENT DOCUMENTS

| | | | |
|---|---|---|---|
| 5,671,412 | A | 9/1997 | Christiano |
| 6,460,070 | B1 | 10/2002 | Turek et al. |
| 8,874,749 | B1 | 10/2014 | Vittal et al. |
| 9,185,170 | B1 | 11/2015 | Grammel et al. |
| 10,432,466 | B2 | 10/2019 | Gangil et al. |
| 10,917,436 | B2 | 2/2021 | Panchalingam et al. |
| 11,182,196 | B2 | 11/2021 | Gamage et al. |
| 11,201,955 | B1 | 12/2021 | Sachveda et al. |
| 2002/0138786 | A1 | 9/2002 | Chefalas et al. |
| 2004/0015746 | A1 | 1/2004 | Christodoulou et al. |
| 2010/0229022 | A1 | 9/2010 | Anand et al. |
| 2011/0296248 | A1 | 12/2011 | Mdal et al. |

(Continued)

FOREIGN PATENT DOCUMENTS

| | | |
|---|---|---|
| CN | 111858117 A | 10/2020 |
| CN | 111897625 A | 11/2020 |

*Primary Examiner* — Joshua P Lottich
(74) *Attorney, Agent, or Firm* — Womble Bond Dickinson (US) LLP

(57) ABSTRACT

A method includes receiving, from a first container of a plurality of virtualized computing entities, a request to diagnose a first network connectivity malfunction associated with the first container. The method further includes identifying a first package of the plurality of packages based on data associated with the first container satisfying at least one criterion of the plurality of criteria.

21 Claims, 7 Drawing Sheets

(56)             References Cited

U.S. PATENT DOCUMENTS

| | | |
|---|---|---|
| 2015/0052402 A1 | 2/2015 | Gurumurthy et al. |
| 2022/0100182 A1 | 3/2022 | Mehrotra et al. |
| 2022/0329522 A1 | 10/2022 | Maciocco et al. |
| 2025/0332451 A1* | 10/2025 | Chen .................... A61N 5/1075 |
| 2025/0358211 A1* | 11/2025 | Singh ...................... H04L 43/55 |

* cited by examiner

Analyze a plurality of container images of a containerized computing cluster, wherein the containerized computing cluster comprises a plurality of virtualized computing entities running on one or more host computer systems
310

In view of the analysis, identify a plurality of packages, each package being configured for diagnosis of a network failure associated with at least one of the plurality of virtualized computing entities, and associate each package with at least one criterion
320

Provide a package library including the plurality of packages, wherein each package of the plurality of packages corresponds to a respective at least one criterion.
330

FIG. 3

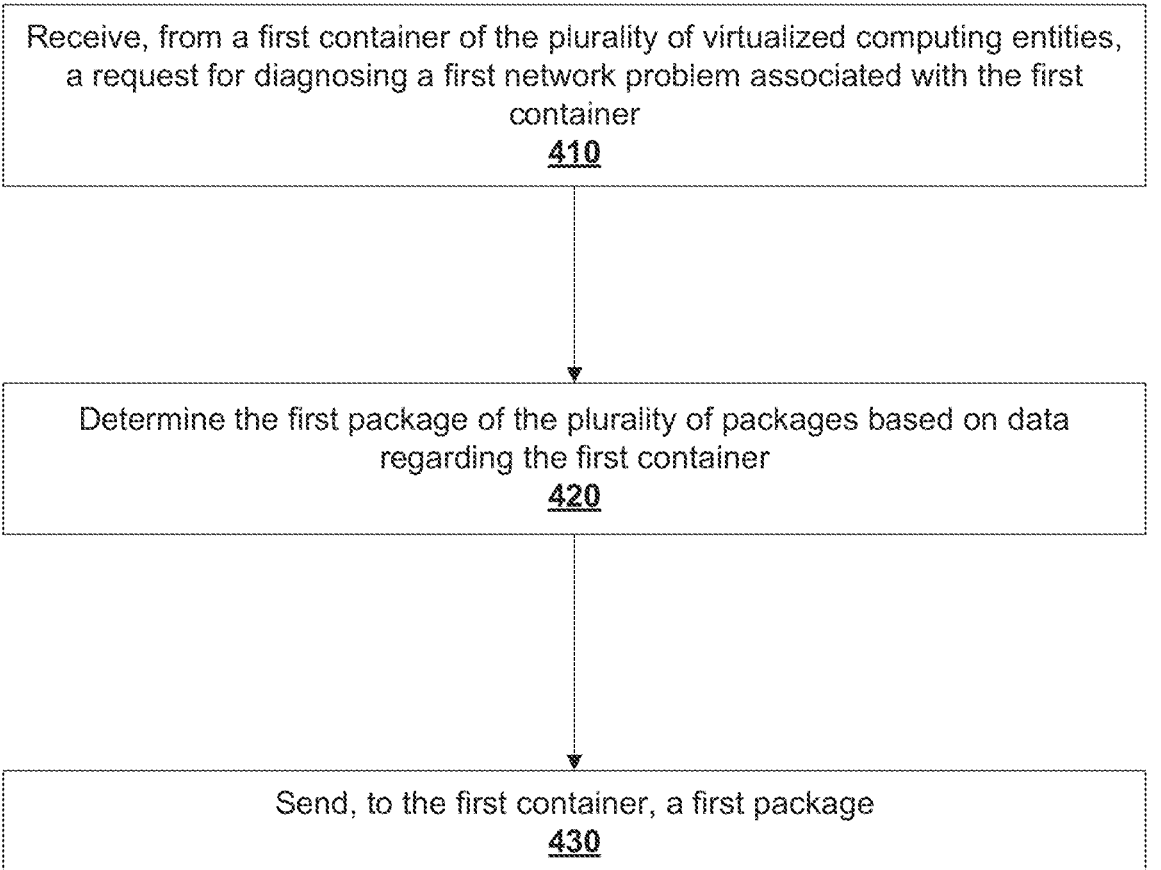
Receive, from a first container of the plurality of virtualized computing entities, a request for diagnosing a first network problem associated with the first container
410
Determine the first package of the plurality of packages based on data regarding the first container
420
Send, to the first container, a first package
430
FIG. 4

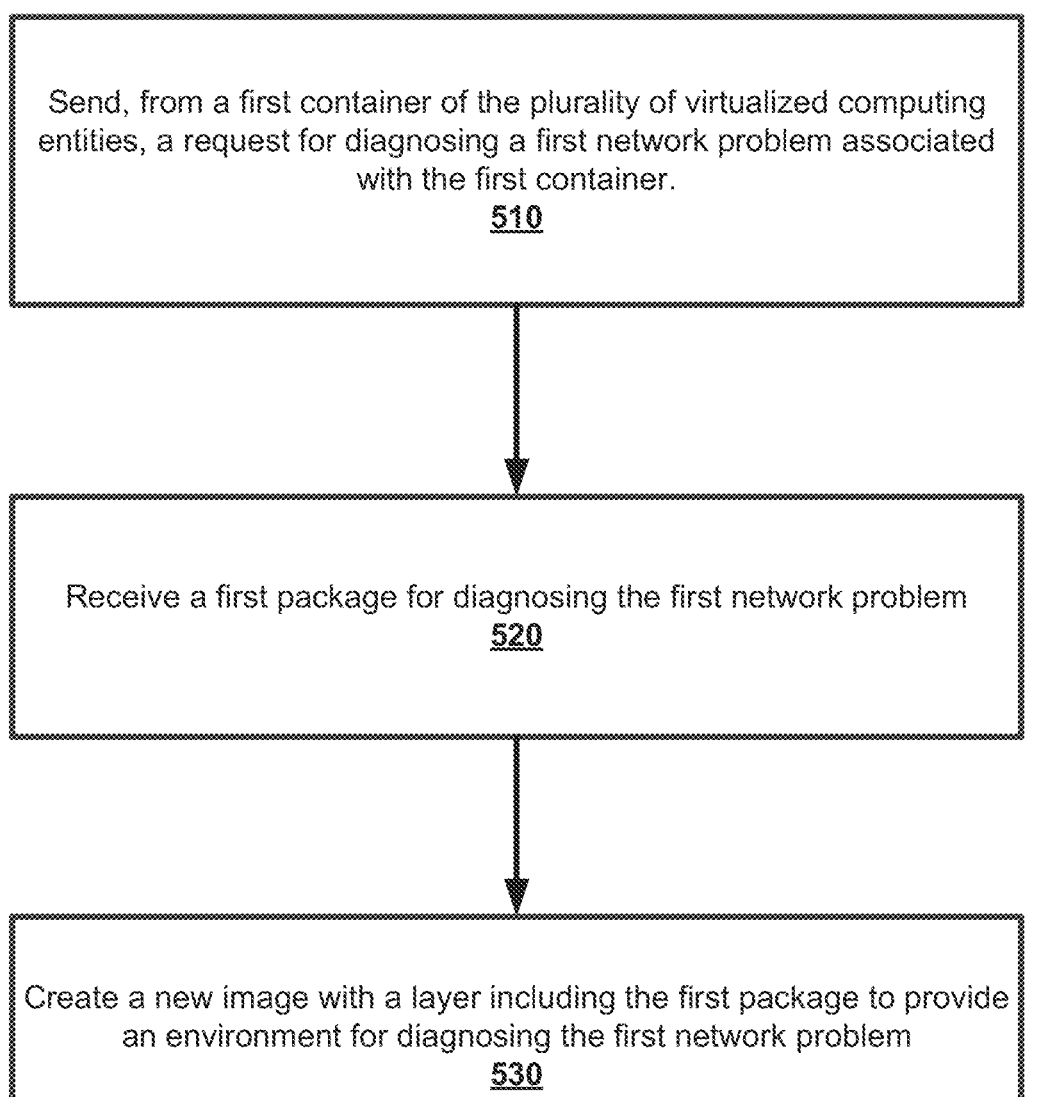
FIG. 5

DYNAMIC NETWORK DEBUG SERVICE IN A CONTAINERIZED COMPUTING CLUSTER

CROSS REFERENCE TO RELATED APPLICATIONS

The application is a continuation of U.S. application Ser. No. 18/082,221, filed on Dec. 15, 2022, the entire contents of which are hereby incorporated by reference herein.

TECHNICAL FIELD

The present disclosure is generally related to cluster computing environment, and more particularly, to a dynamic network debug service in a containerized computing cluster.

BACKGROUND

Cluster computing environments can provide computing resources, such as host computer systems, networks, and storage devices that can perform data processing tasks and can be scaled to handle larger tasks by adding or upgrading resources. Virtualization techniques can be used to create multiple "virtual machines" on each physical host computer system, so the host computer systems can be used more efficiently and with greater flexibility. A hypervisor may run on each host computer system and manage multiple virtual machines. Such virtualization techniques thus provide abstractions of the physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

BRIEF DESCRIPTION OF THE DRAWINGS

The present disclosure is illustrated by way of example, and not by way of limitation, and can be more fully understood with reference to the following detailed description when considered in connection with the figures in which:

FIGS. 3, 4, and 5 depict flow diagrams of example methods for implementing a dynamic network debug service in a containerized computing cluster, in accordance with one or more aspects of the present disclosure.

DETAILED DESCRIPTION

Figure 1:
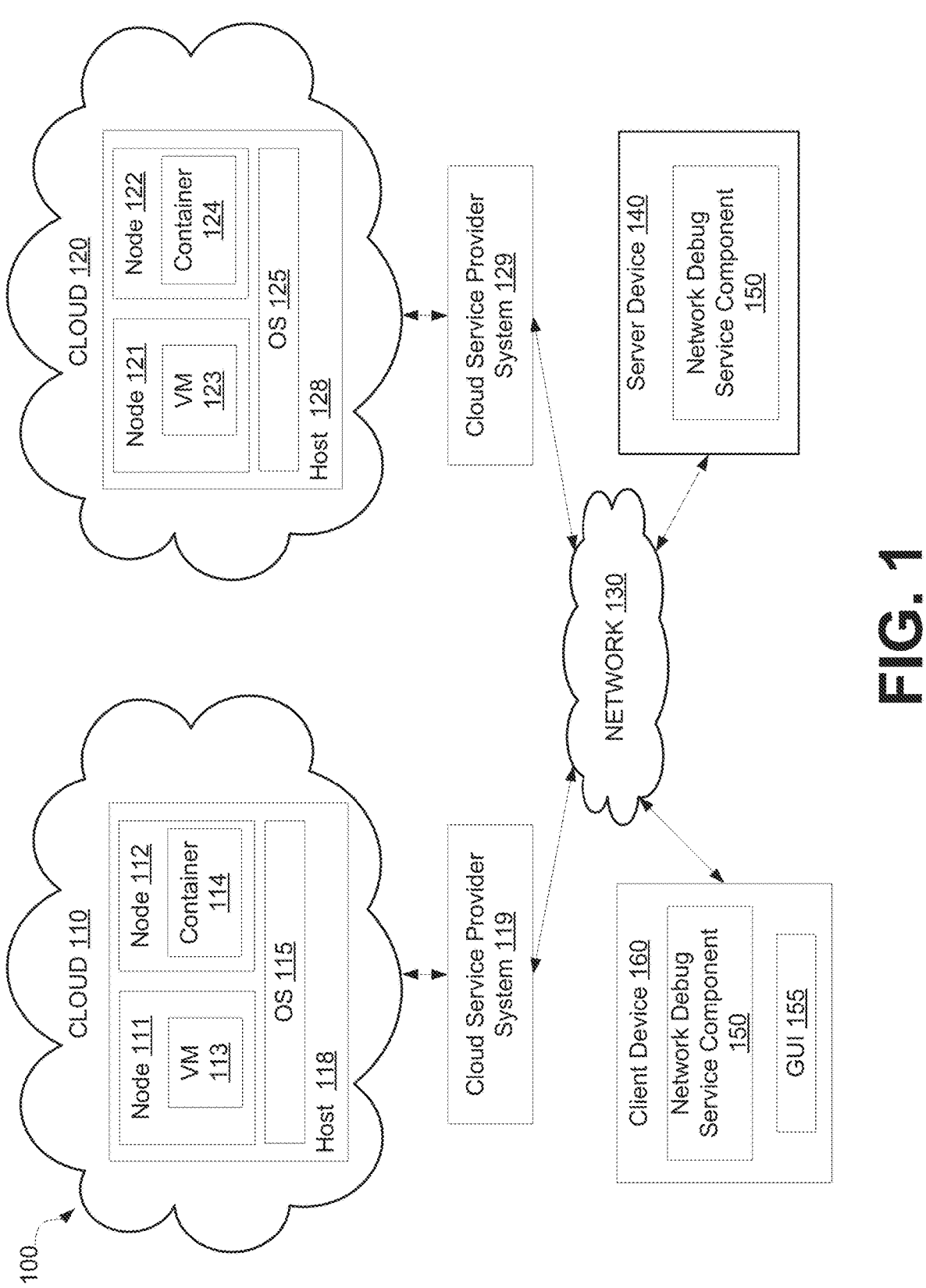
FIG. 1 depicts a high-level component diagram of an example of a computer system architecture, in accordance with one or more aspects of the present disclosure.

Described herein are methods and systems for a dynamic network debug service in a containerized computing cluster.

A containerized cluster may be a cluster of physical or virtual host machines that run containerized applications. The containerized cluster may include virtualized computing entities that represent resources in the cluster, such as virtual machines, nodes, persistent volumes, and networks. A containerized application may run in association with a container, which may handle infrastructure-related tasks such as deployment of the application for operation. The container may include the application and the application's dependencies, which may include libraries and configuration information. Containerized clusters can have numerous components and can depend on numerous other external components such as databases, networks, operating systems, compute nodes, and so on.

Container orchestration systems, such as Kubernetes, can be used to manage containerized workloads and services, and can facilitate declarative configuration and automation. Container orchestration systems can have built-in features to manage and scale stateless applications, such as web applications, mobile backends, and application programming interface (API) services, without requiring any additional knowledge about how these applications operate. For stateful applications, like databases and monitoring systems, which may require additional domain-specific knowledge, container orchestration systems can use operators, such as Kubernetes Operator, to scale, upgrade, and reconfigure stateful applications. "Operator" refers to an application for packaging, deploying, and managing another application within a containerized computing services platform associated with a container orchestration system.

A containerized computing services platform, such as OpenShift, refers to an enterprise-ready container platform with full-stack automated operations that can be used to manage, e.g., hybrid cloud and multicloud deployments. A containerized computing services platform uses operators to autonomously run the entire platform while exposing configuration natively through objects, allowing for quick installation and frequent, robust updates. A containerized application ("application") may be executed in a container that provides a self-contained secure process space in the system, and a system using containers may provide data associated with different applications to a plurality of clients. The data used for the execution of applications can include a container image ("image") built from pre-existing application components and source code of the application. The image may refer to data representing executables and files of the application used to deploy functionality for a runtime instance of the application. A particular tool can be used to build the image for the application by combining pre-existing ready-to-run image corresponding to core functional components of the application (e.g., a web framework, database, etc.) with source code specific to the application.

Because of the complexity of using and managing containerized clusters, there are situations where diagnosis and fixing malfunctions of the clusters can be time consuming or difficult. For example, after deployment of applications, a container can have no or intermittent network connectivity, and the applications running in the container may not realize the network connectivity issue (e.g., the container is deployed with no such function). Normally, when an issue is required to be diagnosed and/or fixed, the system needs to run a command to recreate a container and create a shell on the container for the user for diagnosis. However, since the developer often keeps the images in small sizes for faster operations and less storage, the container, in most cases, does not have a proper tool to diagnose nor fix the network connectivity issue. Sometimes, the network connectivity information is deliberately hidden when deploying applications. Further, since the network connectivity is at issue, the container cannot rely on external resources, for example, a package manager, through the network for diagnosis and/or fixing of the network connectivity issue. In an environment that includes multiple containers, where images can be built from the same or similar base image layer, the incapability to diagnose and fix the network connectivity problem can affect adversely all aspects of the processes from deployment to quality engineering (e.g., detecting errors in the deployment) and can delay the testing and production phase of deployment.

Aspects of the present disclosure address the above and other deficiencies by implementing a dynamic network debug service for diagnosis and/or solution of a network connectivity malfunction of a cluster entity in a containerized computing cluster, where the containerized computing cluster comprises a plurality of virtualized computing entities running on one or more host computer systems. The network connectivity malfunction may cause the cluster entity incapable to connect to a network or communicate with external component via a network, and the network debug service can provide the cluster entity (which cannot handle the network problem) a specifically determined data package to rebuild an image to diagnose and/or solve the network connectivity malfunction of the cluster entity.

Specifically, a control plane (e.g., a control and management component) of the cluster can inspect and analyze a plurality of images with respect to the network connectivity. Each image defines the initial filesystem state of a new container and bundle the application's source code and its dependencies into a self-contained package ready to use with a container runtime. Each image includes one or more layers. Layers reflect the way an image is built, and each step for building an image creates a layer. A layer refers to a difference of the filesystem changes since the last step, and each layer has its own identification (ID) and represents certain filesystem content of the container. The control plane of the cluster can analyze the filesystem content of an image (e.g., a base image and a subsequent image), such as determining whether a conflict exists between layers (between certain file system content), or determining whether configuration data of the cluster entity include data associated with a network (e.g., a specific layer (i.e., specific filesystem data) required for the network). The control plane can use the analysis result to determine network packages suitable for different scenarios. The network package ("package") may refer to a set of executable code and its dependencies required to diagnose and/or solve a network malfunction. In some implementations, the control plane identifies network packages for different scenarios and associates the network packages with one or more criteria.

For example, the control plane may identify that if the image is a base image, a package X is required, and if the image is a subsequent image, a package Y is required. The control plane may associate package X and/or Y with a criterion of whether the image is a based image or a subsequent image. In another example, the control plane may identify that if a conflict exists between layers, a package M is required, and if a conflict does not exist between layers, a package N is required. The control plane may associate package M and/or N with a criterion of whether a conflict exists between layers of an image. In yet another example, the control plane may identify that if specific configuration data exists, a package O is required, and if specific configuration data does not exist, a package P is required. The control plane may associate package O and/or P with a criterion of whether specific configuration data is included in the image. Thus, the criteria may include whether an image is a base image or a subsequent image, whether a conflict exists between layers of an image, and/or whether specific configuration data is included in the image.

The control plane can also use a rule engine to process rules for network connectivity to determine network packages suitable for different scenarios. For example, a rule may require that a specific image always includes a specific layer to ensure a network connectivity. The control plane may store data related to the determination of the package to a package library. The package library may store a list of packages associated with different scenarios (e.g., including one or more criteria), and the control plane can maintain and update the package library dynamically.

As such, when a cluster entity (e.g., a virtualized computing entity) encounters a network connectivity malfunction, the cluster entity may send a request to the control plane for a network package. Specifically, the cluster entity may determine whether a malfunction encountered by the cluster entity is a network connectivity malfunction before taking an action for diagnosis, and responsive to determining that the malfunction encountered is a network connectivity malfunction, the cluster entity may generate a request including a flag bit indicating the request is related to a network connectivity malfunction. The control plane, upon receiving the request, can determine a package based on data regarding the cluster entity. The data regarding the cluster entity may be included in the request or may be requested and received by the control plane. In some implementations, the control plane can compare data regarding the cluster entity with criteria stored in the package library, and when finding a matched criterion, the control plane determines a package to be the package corresponding to the matched criterion and send the package to the cluster entity. In some implementations, the control plane can use data regarding the cluster entity to determine a package dynamically, for example, through an artificial intelligence model based on data from a plurality of images, and send the package to the cluster entity.

The cluster entity, in response to receiving the package, can create a new image with a layer including the package. The created image can be used to diagnose and/or solve the network connectivity malfunction because the package includes the necessary data for diagnosis and/or solution. The created image can provide the user an environment (e.g., a shell of new pod) to diagnose and/or solve the network connectivity malfunction.

Advantages of the present disclosure include enhancing functionality by rendering a cluster capability for diagnosis and/or solution of a network connectivity malfunction and improving efficiency and speed of providing diagnosis and/or solution. Using a dynamic network debug service with the image analysis component and the rule engine provides an efficient way to maintain, update, and manage network packages that can be used for diagnosis and/or solution of various network connectivity malfunctions.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 110, 120 (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 118, 128 implemented as part of the clouds 110, 120. For example, nodes 111 and 112 are hosted on physical machine of host 118 in cloud 110 provided by cloud provider 119. Similarly, nodes 121 and 122 are hosted on physical machine of host 128 in cloud 120 provided by cloud provider 129. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 118, 128. It should be noted, that while two cloud providers systems have been depicted in FIG. 1, in some implementations more or fewer cloud service provider systems (and corresponding clouds) may be present.

In some implementations, the host machines 118, 128 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 118, 128 without the use of VMs (e.g., a "bare metal" implementation), and in such an implementation, the hosts themselves are referred to as "nodes".

In various implementations, developers, owners, and/or system administrators of the applications may maintain applications executing in clouds 110, 120 by providing software development services, system administration services, or other related types of configuration services for associated nodes in clouds 110, 120. This can be accomplished by accessing clouds 110, 120 using an application programmer interface (API) within the applicable cloud service provider system 119, 129. In some implementations, a developer, owner, or system administrator may access the cloud service provider system 119, 129 from a client device (e.g., client device 160) that includes dedicated software to interact with various cloud components. Additionally, or alternatively, the cloud service provider system 119, 129 may be accessed using a web-based or cloud-based application that executes on a separate computing device (e.g., server device 140) that communicates with client device 160 via a network 130.

Client device 160 is connected to host 118 in cloud 110 and host 128 in cloud 120 and the cloud service provider systems 119, 129 via a network 130, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 118, 128 may be a server computer system, a desktop computer, or any other computing device. The cloud service provider systems 119, 129 may include one or more machines such as server computers, desktop computers, etc. Similarly, server device 140 may include one or more machines such as server computers, desktop computers, etc.

In some implementations, the client device 160 may include a network debug service component 150, which can implement a rule engine for managing custom resources in an operator framework. The details regarding network debug service component 150 implementing a rule engine for managing API objects in an operator framework will be described with respect to FIG. 2A. Network debug service component 150 may be an application that executes on client device 160 and/or server device 140. In some implementations, network debug service component 150 can function as a web-based or cloud-based application that is accessible to the user via a web browser or thin-client user interface that executes on client device 160. For example, the client machine 160 may present a graphical user interface (GUI) 155 (e.g., a webpage rendered by a browser) to allow users to input rule sets and/or facts, which may be processed using network debug service component 150. The process performed by network debug service component 150 can be invoked in a number of ways, such as, e.g., a web front-end and/or a Graphical User Interface (GUI) tool. In some implementations, a portion of network debug service component 150 may execute on client device 160 and another portion of network debug service component 150 may execute on server device 140. While aspects of the present disclosure describe network debug service component 150 as implemented in a PaaS environment, it should be noted that in other implementations, network debug service component 150 can also be implemented in an Infrastructure-as-a-Service (IaaS) environment associated with a containerized computing services platform, such as Red Hat® OpenStack®. The functionality of network debug service component 150 to using rule engine for managing API objects in an operator framework will now be described in further detail below with respect to FIGS. 2A and 2B.

Figure 2A:
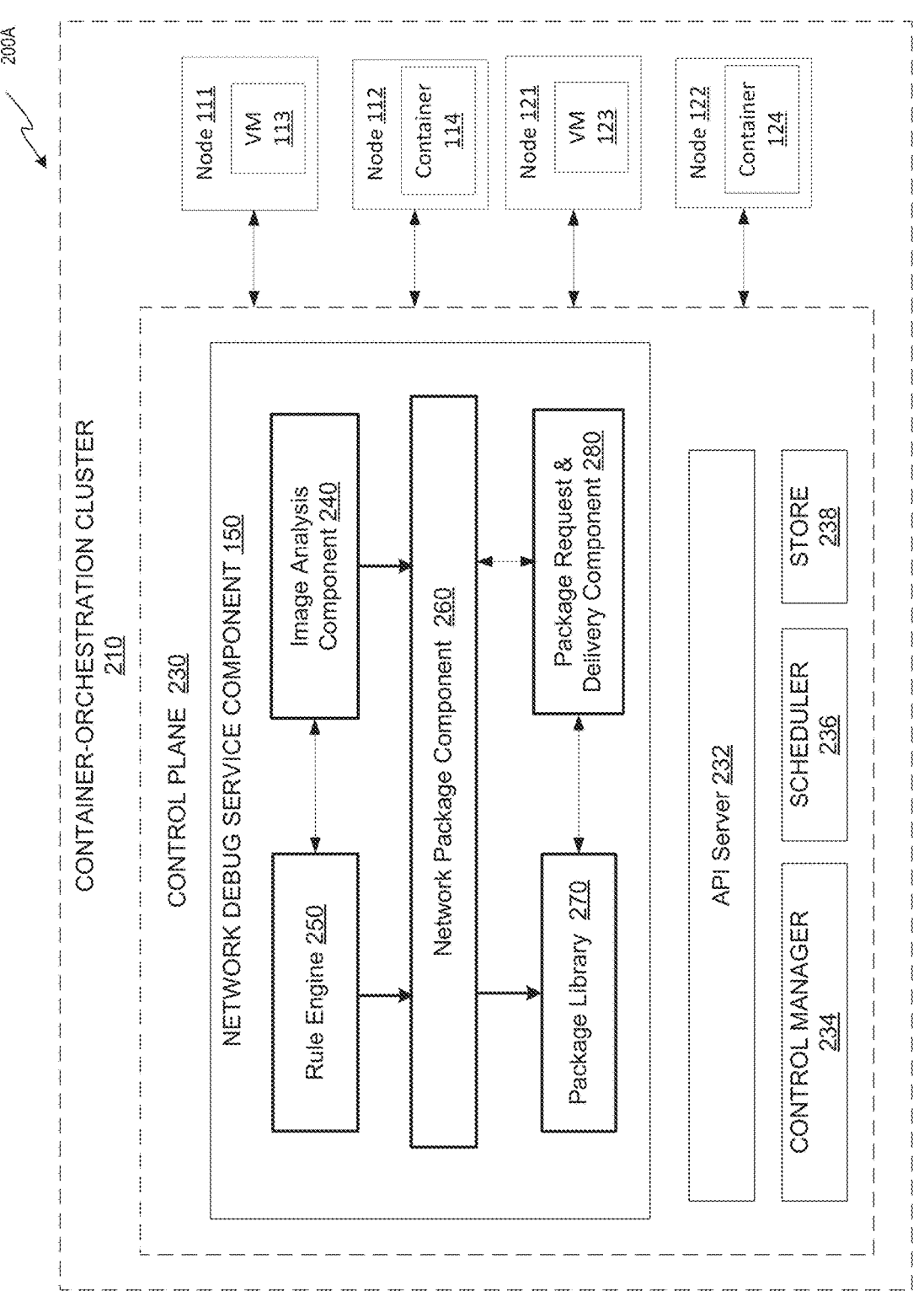
FIG. 2A depicts a component diagram of an example of a containerized computing cluster, in accordance with one or more aspects of the present disclosure.

FIG. 2A illustrates an example system 200A that implements a network debug service component 150. The system 200A includes a cluster 210. The cluster 210 is a cluster managed by a container orchestration system, such as Kubernetes. Using clusters can allow a business entity having multiple services requirements to manage containerized workloads and services and facilitate declarative configuration and automation that is specific to one service among the multiple services.

The cluster 210 includes a control plane 230 and a collection of nodes (e.g., nodes 111, 112, 121, 122). The control plane 230 is a collection of components that can make global control and management decisions about a cluster described below. The control plane 230 is responsible for maintaining the desired state (i.e., a state desired by a client when running the cluster) of the cluster 210, and such maintaining requires information regarding which applications are running, which container images applications use, which resources should be made available for applications, and other configuration details. The control plane 230 may include an API server 232, a control manager 234, a scheduler 236, and a store 238. The API server 232 can be used to define the desired state of the cluster 210. For example, the desired state can be defined by configuration files including manifests, which are JSON or YAML files that declare the type of application to run and the number of replicas required to run. The API server 232 can provide an API, for example, using JSON over HTTP, which provides both the internal and external interface. The API server can process and validate requests and update the state of the API objects in a persistent store, thereby allowing clients to configure workloads and containers across worker nodes. The API server can monitor the cluster 210, roll out critical configuration changes, or restore any divergences of the state of the cluster 210 back to what the deployer declared.

The control manager 234 can manage a set of controllers, such that each controller implements a corresponding control loop that drives the actual cluster state toward the desired state, and communicates with the API server to create, update, and delete the resources it manages (e.g., pods or service endpoints). For example, where the desired state requires two memory resources per application, if the actual state has one memory resource allocated to one application, another memory resource will be allocated to that application. The scheduler 236 can select a node for running an unscheduled pod (a basic entity that includes one or more containers/virtual machines and is managed by the scheduler), based on resource availability. The scheduler 236 can track resource use on each node to ensure that workload is not scheduled in excess of available resources. The store 238 is a persistent distributed key-value data store that stores the configuration data of the cluster, representing the overall state of the cluster at any given point of time.

The API server 232 can include a network debug service component 150 that can dynamically provide a network debug service for diagnosis and/or solution of a network problem to containers in need. Network debug service component 150 includes an image analysis component 240 that analyzes images, a rule engine 250 that provides rules for network debug service, a network package component 260 that identifies network packages for different situations based on various criteria, a package library 260 that creates and maintains a list of package, and a package request and delivery component 280 that receives a request for package and delivers a package. Each component will be described in detail below.

The image analysis component 240 can inspect and analyze one or more images. Each image defines the initial filesystem state of a new container and bundle the application's source code and its dependencies into a self-contained package ready to use with a container runtime. Each image includes one or more layers, and each layer has its own identification (ID) and represents certain filesystem content of the container. Each layer represents the change created by a build step relative to the previous layer. Each layer can be a final layer of the image or can be a layer on which the next layer is built. Each layer can be a result of an instruction of the system. Only the image is tagged and used by an end user. Both the layer and the image can serve as building blocks of an image and can be stored in a library (e.g., cache) for a future use to avoid redundant work. For example, a first layer (also referred to as base layer) may contain the operating system, core system tools, and tools necessary to install packages and make updates to the image over time, and when tagged, the first layer become a base image.

The image analysis component 240 can analyze a base image with respect to the network. For example, the image analysis component 240 can analyze a base image that has no network connectivity malfunction and find one or more features or prerequisites for such base image. In another example, the image analysis component 240 can analyze a base image that has a network connectivity malfunction and find one or more features or prerequisites for such base image. In yet another example, the image analysis component 240 can conclude a likelihood of a specific base image or a specific type of base image that encounters a network connectivity malfunction when one or more features or prerequisites are present or missing. In some implementations, the image analysis component 240 can recommend one or more specific layers for a certain base image or a certain type of base image.

The image analysis component 240 can analyze a subsequent image with respect to the network. The subsequent image is an image with one or more layers built on a base image. The image analysis component 240 can perform the analysis of a subsequent image in view of the analysis of its base image. For example, the image analysis component 240 can analyze a subsequent image that has no network connectivity malfunction and find one or more features or prerequisites of such subsequent image as well as some features of its base image. In another example, the image analysis component 240 can analyze a subsequent image that has a network connectivity malfunction and find one or more features or prerequisites of such subsequent image as well as some features of its base image. In yet another example, the image analysis component 240 can conclude a likelihood of a specific subsequent image or a specific type of subsequent image that encounters a network connectivity malfunction when one or more features or prerequisites of such subsequent image as well as some features of its base image are present or missing. In some implementations, image analysis component 240 can analyze a conflict between layers of a subsequent image to determine a solution for a network connectivity malfunction in the case of the conflict. For example, the conflict can happen between one layer using an old version of filesystem data and the other layer using a new version of the same filesystem data, and the solution may include predetermined diagnosis filesystem data.

The image analysis component 240 can analyze configuration data associated with an image. The configuration data can refer to data that needs to be accessed by the cluster for normal operations, including, for example, cluster desired states and cluster current states (such as which applications are running and which container images they use, which resources are available for them, and other configuration details) and their replicas. The image analysis component 240 can determine specific configuration data required for a network. The image analysis component 240 can analyze a plurality of images as described above and send the analysis result to the network package component 260.

The network package component 260 can use the analysis result received from the image analysis component 240 to identify network packages suitable for different scenarios. In some implementations, the package may include data to be used as a tool to diagnose and/or solve a network connectivity malfunction. In some implementations, the package may include one or more pre-built image or layer which the administrator knows would be useful in diagnosing and/or solving a network connectivity malfunction. In some implementations, the package may be in a form of a layer with a layer identifier (ID) and include configuration data for diagnosis and/or solution of a network connectivity malfunction. The image analysis component 240 identifies network packages suitable for different scenarios and associates the network packages with one or more criteria. The criteria may include whether an image includes a feature of a base image, whether an image includes a feature of a dependent layer, whether an image includes a conflict between layers, and/or whether an image includes a feature of configuration.

For example, the image analysis component 240 can identify a first package based on that the image is a base image and associate the first package with a criterion of whether the image is a base image; the image analysis component 240 can identify a second package based on that the image has a dependent layer and associate the second package with a criterion of whether the image is a subsequent image; the image analysis component 240 can identify a third package based on that the image has a conflict between two layers and associate the third package with a criterion of whether the image has a conflict between two layers; and the image analysis component 240 can identify a fourth package based on that the image has a specific configuration, for example, of available resources, and associate the fourth package with a criterion of whether the image has the specific configuration. In some implementations, the image analysis component 240 can associated a package with multiple criteria, and each of the criteria can be assigned to a respective priority. For example, if a scenario satisfies both a first criterion and a second criterion, and the second criterion has a higher priority than the first criterion, the image analysis component 240 can use a package based on the second criterion for the scenario. In some implementations, the image analysis component 240 may use one or more artificial intelligence models to make a more adaptive association of the package with respect to the criteria. For example, the artificial intelligence model can use a set of data including packages and criteria for training and learn, from the training, to output a better association of the package for a scenario including one or more criteria.

The network package component 260 can also use a rule engine 250 to allow a rule input from engineers and business regarding a policy to identify network packages suitable for different scenarios and associate the network packages accordingly. For example, a rule may require that a specific image always includes a specific layer to ensure a network connectivity. In some implementation, the rule engine 250 can provide a recurring problem associated with a cluster or cluster entity and a predetermined solution to the recurring problem. For example, the predetermined solution can be one or more predefined layers provided to the cluster. In some implementations, the rule engine 250 can provide a manual input to solve a problem associated with a specific cluster or cluster entity. For example, a specific image in the cluster has been analyzed, for example, by the image analysis component 240, to show that there is a conflict between the layers of the image, and a customized solution that has been provided by an engineer according to the analysis can be manually inputted to the rule engine 250.

The rule engine 250 can be a software that processes information by applying rules to facts. Each rule has a left-hand side that specifies the constraints of the rule and a right-hand side that defines one or more actions to perform if the constraints of the rule are satisfied. Techniques to specify rules can vary, including using Java objects to describe rules, using a Domain Specific Language (DSL) to express rules, or using a GUI to enter rules. The rules can be defined using a scripting language or other programming language, and can be in a format of a data file or an Extended Markup Language (XML) file, etc. The rule engine 250 can store the rules in a rule repository. The rule repository (also referred to as the production memory) may include an area of memory and/or secondary storage that stores the rules that will be used to evaluate against facts. The rule repository may include one or more file systems, may be a rule database, may be a table of rules, or may be some other data structure for storing a rule set. The rule engine 250 can receive the rules from the rule repository and evaluate the rules against facts from a working memory. The facts can be data objects that are input by a user (e.g., a business entity or its client). To evaluate the rules, the rule engine may use an algorithm that defines a way to organize facts in a pre-defined structure and allows the rule engine to generate conclusions and trigger actions on the facts according to the rules. The result is placed into a data store, which provides a list of rules to be executed and the facts on which to execute the rules by perform the actions.

The network package component 260 may store data related to the determination of the package to the package library 270. The package library 270 may store a list of package associated with different scenarios (e.g., including one or more criteria). In some implementation, the package library 270 can include a data structure. The data structure may include a plurality of records, and each record includes a package and the corresponding one or more criteria. The network package component 260 can maintain and update the package library.

The package request and delivery component 280 may receive a request from a cluster entity (e.g., a container 114, 124) of the cluster 210, and in response second a package to the cluster entity. The request may include an indication (e.g., a flag bit) indicating a network connectivity malfunction of the cluster entity. The request may include information related to the cluster entity. For example, if the image of the cluster entity is a base image, the request may include information that indicates the image with the network connectivity malfunction is a base image.

In some implementations, the package request and delivery component 280 may, based on the information regarding the cluster entity that has sent the request, search in the package library 270 to find a matched criterion and the corresponding package. For example, the package request and delivery component 280 can compare the information regarding the cluster entity and the criteria included in the package library 270 to find a matched criterion with the information regarding the cluster, and the package request and delivery component 280 can determine a package to be the package corresponding to the matched criterion. In some implementations, the information regarding the cluster entity may be included in the request. In some implementations, the package request and delivery component 280 may send a request to the cluster entity for information regarding the cluster entity and receive the information in response.

In some implementations, the package request and delivery component 280 may relay the request to the network package component 260 to determine a package based on the information regarding the cluster entity. In some implementations, the package request and delivery component 280 may search in the package library 270 first and if there is no match found in the package library 270, the package request and delivery component 280 may notify about a wanted package is missing in the package library 270 and send the notification to the network package component 260 to determine a package, which can be similar to the determination of packages described above.

The package request and delivery component 280 can send the package to the cluster entity. The cluster entity, for example, a container 114 or 124, in response to receiving the package, can create a new image with a layer including the package. The created image can be used by a user to diagnose and/or solve the network connectivity malfunction because the package would include the necessary data for such task. In some implementations, the new image can be a result of applying one layer including the package to the existing container image. In some implementations, the new image can be a pre-built image including the package, and the pre-built image is received from the package request and delivery component 280.

Figure 2B:
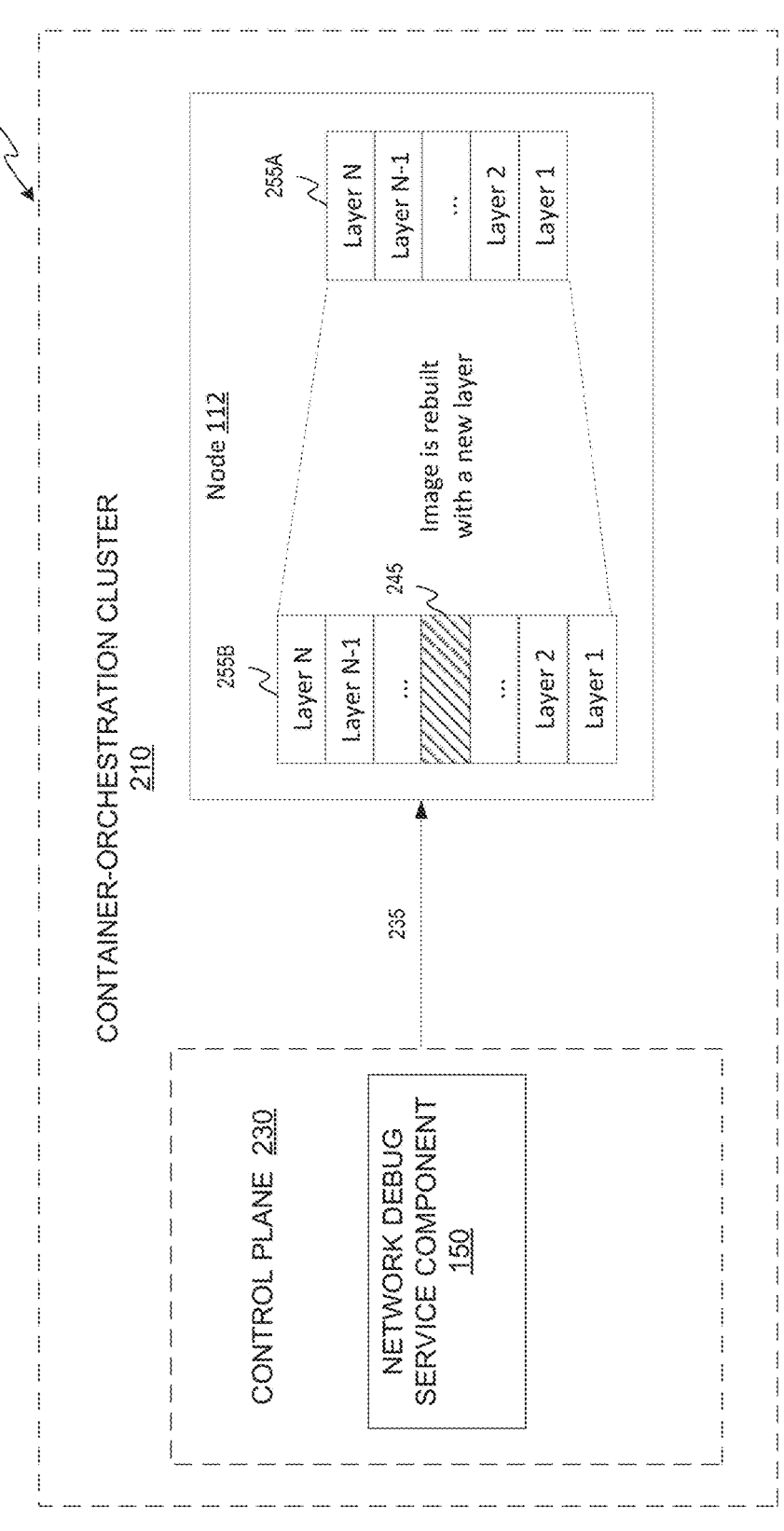
FIG. 2B depicts a component diagram of an example of a containerized computing cluster rebuilding an image with a new layer provided by a network debug service, in accordance with one or more aspects of the present disclosure.

FIG. 2B illustrates an example system 200B that implements a network debug service component 150 to send a package to a cluster entity. The system 200B includes a cluster 210. The cluster 210 includes a control plane 230. The control plane 230 includes a network debug service component 150. When the network debug service component 150 determines a package to send to a node 112, the network debug service component 150 sends the package 235 to the node 112. The node 112 may include an original image 255A, and the original image 255A includes N layers. The node 112 may use the package 235 to rebuild a new image 255B, and the new image 255B includes N layers and a new layer 245. The original image 255A does not have necessary data for diagnosis and/or solution of the network connectivity malfunction, but the new image 255B has necessary data for diagnosis and/or solution of the network connectivity malfunction because of the new layer 245.

FIGS. 3, 4, and 5 depict flow diagrams of illustrative examples of methods 300, 400, and 500 for implementing a dynamic network debug service in a containerized computing cluster, in accordance with one or more aspects of the present disclosure. Methods 300, 400, and 500 and each of its individual functions, routines, subroutines, or operations may be performed by one or more processors of the computer device executing the method. In certain implementations, methods 300, 400, and 500 may be performed by a single processing thread. Alternatively, methods 300, 400, and 500 may be performed by two or more processing threads, each thread executing one or more individual functions, routines, subroutines, or operations of the method. In an illustrative example, the processing threads implementing methods 300, 400, and 500 may be synchronized (e.g., using semaphores, critical sections, and/or other thread synchronization mechanisms). Alternatively, the processes implementing methods 300, 400, and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, method 300 may be performed by processing devices of a controller plane of a cluster. At operation 310, the processing device analyzes a plurality of container images of a containerized computing cluster, wherein the containerized computing cluster comprises a plurality of virtualized computing entities running on one or more host computer systems. In some implementations, the container images include at least one of: a base image or a subsequent image.

At operation 320, the processing device, in view of the analysis, identifies a plurality of packages, each package being configured for diagnosing a network failure (e.g., a network connectivity malfunction) associated with at least one of the plurality of virtualized computing entities, and associating each package with at least one criterion. In some implementations, the at least one criterion includes at least one of: whether an image is a base image or a subsequent image, whether a conflict exists between layers of an image, or whether specific configuration data is included in an image. In some implementations, the processing device also creates at least one rule for diagnosing a network failure, and in view of the at least one rule, identifies the plurality of packages and associating each package with at least one criterion.

At operation 330, the processing device provides a package library including the plurality of packages, wherein each package of the plurality of packages corresponds to a respective at least one criterion. In some implementation, the package library can include a data structure. The data structure may include a plurality of records, and each record includes a package and the corresponding one or more criteria. The processing device can maintain and update the package library.

Referring to FIG. 4, method 400 may be performed by processing devices of a controller plane of a cluster. At operation 410, the processing device receives, from a first container of a plurality of virtualized computing entities of a containerized computing cluster, a request for diagnosing a first network connectivity malfunction associated with the first container, wherein the containerized computing cluster comprises the plurality of virtualized computing entities running on one or more host computer systems. In some implementations, the request includes an indication indicating a network connectivity malfunction of the first container. In some implementations, the request may include information related to the first container.

At operation 420, the processing logic determines the first package of the plurality of packages based on data regarding the first container. The processing logic identifies the first package of the plurality of packages based on data associated with the first container satisfying at least one criterion of the plurality of criteria. In some implementations, the processing logic determines the first package of the plurality of packages by searching in the package library for a match of the on data regarding the first container with one of criteria, and determine the first package as the corresponding package to the matched criterion.

At operation 430, the processing logic sends, to the first container, the first package. In some implementations, the first package is included in a layer of a new image created by the first container, and the new image provides an environment (e.g., a shell of new pod) for diagnosing the first network connectivity malfunction using the first package.

Referring to FIG. 5, method 500 may be performed by processing devices of a container of a cluster. At operation 510, the processing logic sends, from a first container of the plurality of virtualized computing entities, to a controller of the cluster, a request for diagnosing a first network connectivity malfunction associated with the first container. At operation 520, the processing logic receives, from a controller of the cluster, to the first container, a first package for diagnosing the first network connectivity malfunction. At operation 530, the processing logic creates a new image with a layer including the first package to provide an environment for diagnosing the first network connectivity malfunction.

Figure 6:
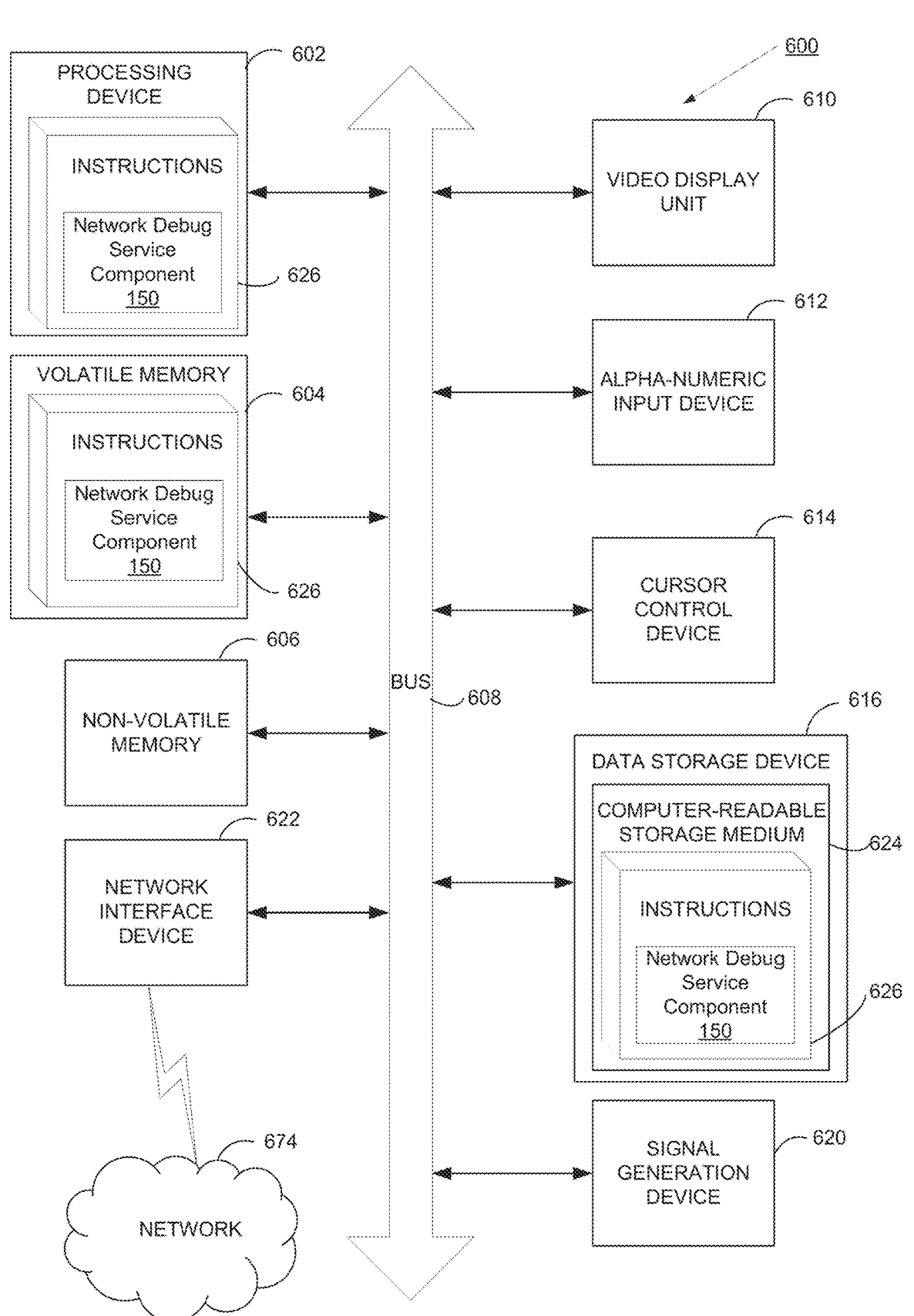
FIG. 6 depicts a block diagram of an example computer system operating in accordance with one or more aspects of the present disclosure.

FIG. 6 depicts an example computer system 600, which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 is configured to execute processing logic (e.g., instructions 626) that includes the Network debug service component 150 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include Network debug service component 150 (e.g., corresponding to the methods of FIGS. 4-5) embodying any one or more of the methodologies or functions described herein. Network debug service component 150 may also reside, completely or at least partially, within the main memory 604 and/or within the processing device 602 during execution thereof by the computer system 600, the main memory 604, and the processing device 602 also constituting computer-readable media. Network debug service component 150 may further be transmitted or received via the network interface device 622.

While the computer-readable storage medium 624 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may include a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
receiving, from a first container of a plurality of virtualized computing entities, a request to diagnose a first network connectivity malfunction associated with the first container; and
identifying, by a processing device, a first package of a plurality of packages based on data associated with the first container satisfying at least one criterion of a plurality of criteria.

2. The method of claim 1, wherein the request includes a flag bit indicating the first network connectivity malfunction.

3. The method of claim 1, wherein the request includes information that indicates that the first network connectivity malfunction is associated with a base image.

4. The method of claim 1, further comprising:
creating at least one rule to diagnose a network failure.

5. The method of claim 1, further comprising:
maintaining a package library including the plurality of packages and the plurality of criteria, wherein each package of the plurality of packages corresponds to a respective at least one criterion.

6. The method of claim 1, further comprising:
sending, to the first container, the first package.

7. The method of claim 1, wherein each of the plurality of criteria comprises at least one of:
whether an image is a base image or a subsequent image,
whether a conflict exists between layers of the image, or
whether specific configuration data is included in the image.

8. The method of claim 1, wherein the first package comprises a pre-built image.

9. The method of claim 1, further comprising:
creating, by the first container, a new image with a layer including the first package, wherein the new image provides executable data to diagnose the first network connectivity malfunction.

10. A system comprising:
a memory; and
a processing device, operatively coupled to the memory, to:
receive, from a first container of a plurality of virtualized computing entities, a request to diagnose a first network connectivity malfunction associated with the first container; and
identify a first package of a plurality of packages based on data associated with the first container satisfying at least one criterion of a plurality of criteria.

11. The system of claim 10, wherein the request includes a flag bit indicating the first network connectivity malfunction.

12. The system of claim 10, wherein the request includes information that indicates that the first network connectivity malfunction is associated with a base image.

13. The system of claim 10, wherein the processing device is to further to:
create at least one rule for diagnosing a network failure.

14. The system of claim 11, wherein the processing device is further to:
maintain a package library comprising the plurality of packages and the plurality of criteria, wherein each package of the plurality of packages corresponds to a respective at least one criterion.

15. The system of claim 10, wherein the processing device is further to:
send, to the first container, the first package.

16. The system of claim 10, wherein each of the plurality of criteria comprises at least one of:
whether an image is a base image or a subsequent image,
whether a conflict exists between layers of the image, or
whether specific configuration data is included in the image.

17. The system of claim 10, wherein the first package comprises a pre-built image.

18. A non-transitory computer-readable storage medium comprising instructions that, when executed by a processing device, cause the processing device to:
receive, from a first container of a plurality of virtualized computing entities, a request to diagnose a first network connectivity malfunction associated with the first container; and
identify, by the processing device, a first package of a plurality of packages based on data associated with the first container satisfying at least one criterion of a plurality of criteria.

19. The non-transitory computer-readable storage medium of claim 18, wherein the instructions, when executed by the processing device, cause the processing device further to:

send, to the first container, the first package.

20. The non-transitory computer-readable storage medium of claim 18, wherein the first package comprises a pre-built image.

21. The non-transitory computer-readable storage medium of claim 18, wherein the instructions, when executed by the processing device, cause the processing device further to:

maintain a package library comprising the plurality of packages and the plurality of criteria, wherein each package of the plurality of packages corresponds to a respective at least one criterion.

\* \* \* \* \*